US010921690B2

(12) United States Patent
Liu et al.

(10) Patent No.: US 10,921,690 B2
(45) Date of Patent: Feb. 16, 2021

(54) GIMBAL PHOTOGRAPHING DEVICE

(71) Applicant: SZ DJI OSMO TECHNOLOGY CO., LTD., Shenzhen (CN)

(72) Inventors: Yifen Liu, Shenzhen (CN); Dengfeng Hu, Shenzhen (CN); Qiu Lan, Shenzhen (CN); Tianfei Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/736,027

(22) Filed: Jan. 7, 2020

(65) Prior Publication Data
US 2020/0142284 A1 May 7, 2020

Related U.S. Application Data

(63) Continuation of application No. PCT/CN2017/095217, filed on Jul. 31, 2017.

(51) Int. Cl.
*G03B 17/56* (2006.01)
*F16M 11/08* (2006.01)
(Continued)

(52) U.S. Cl.
CPC .......... *G03B 17/561* (2013.01); *F16M 11/08* (2013.01); *F16M 11/18* (2013.01);
(Continued)

(58) Field of Classification Search
USPC ....................................................... 396/428
See application file for complete search history.

(56) References Cited

U.S. PATENT DOCUMENTS 6,411,332 B1 6/2002 Whitby et al.
7,922,401 B2 4/2011 McKay
(Continued)

FOREIGN PATENT DOCUMENTS

CN 101758929 A 6/2010
CN 204420520 U 6/2015
(Continued)

OTHER PUBLICATIONS

World Intellectual Property Organization (WIPO) International Search Report for PCT/CN2017/095217 dated May 7, 2018 6 Pages.

*Primary Examiner* — Clayton E. LaBalle
*Assistant Examiner* — Warren K Fenwick
(74) *Attorney, Agent, or Firm* — Anova Law Group, PLLC

(57) ABSTRACT

A gimbal photographing device includes a machine body, a foldable mechanism connected with the machine body, and a gimbal camera connected with the foldable mechanism. The gimbal camera is configured to cling to the machine body through the foldable mechanism, and is configured to be positioned in an extended state or a folded state. The machine body includes a support wall configured to support the foldable mechanism and the gimbal camera. The foldable mechanism includes a base including a rotation member and a position limiting member connected with the rotation member. The position limiting member is connected with the gimbal camera. The position limiting member includes a first end and a second end that are opposingly disposed. The rotation member is rotatably connected with the support wall around a rotation axis direction to cause the gimbal camera to rotate relative to the machine body.

25 Claims, 6 Drawing Sheets

(51) Int. Cl.
*F16M 11/20* (2006.01)
*F16M 11/38* (2006.01)
*F16M 11/18* (2006.01)

(52) U.S. Cl.
CPC ..... *F16M 11/2042* (2013.01); *F16M 11/2071* (2013.01); *F16M 11/38* (2013.01); *F16M 2200/021* (2013.01); *F16M 2200/068* (2013.01)

(56) References Cited

U.S. PATENT DOCUMENTS

| | | | | |
|---|---|---|---|---|
| 10,845,680 | B2* | 11/2020 | Liu | .................... F16M 11/2028 |
| 2006/0262274 | A1 | 11/2006 | Brown et al. | |
| 2019/0154191 | A1* | 5/2019 | Ma | ....................... G03B 17/561 |
| 2019/0339595 | A1* | 11/2019 | Liu | ........................ F16M 11/18 |
| 2020/0124228 | A1* | 4/2020 | Guo | ....................... G03B 17/56 |
| 2020/0124947 | A1* | 4/2020 | Liu | ........................ F16M 11/06 |
| 2020/0149678 | A1* | 5/2020 | Liu | ..................... G03B 17/563 |

FOREIGN PATENT DOCUMENTS

| | | |
|---|---|---|
| CN | 204858123 U | 12/2015 |
| CN | 205402194 U | 7/2016 |
| CN | 205606108 U | 9/2016 |
| CN | 205896649 U | 1/2017 |
| CN | 205919075 U | 2/2017 |
| CN | 205979046 U | 2/2017 |
| CN | 206018229 U | 3/2017 |
| DE | 202012008790 U1 | 2/2013 |
| JP | 2012151521 A | 8/2012 |
| JP | 2019203937 A | 11/2019 |
| KR | 20150028277 A | 3/2015 |
| KR | 20170002376 U | 7/2017 |

\* cited by examiner

GIMBAL PHOTOGRAPHING DEVICE

CROSS-REFERENCE TO RELATED APPLICATION

This application is a continuation application of International Application No. PCT/CN2017/095217, filed on Jul. 31, 2017, the entire content of which is incorporated herein by reference.

TECHNICAL FIELD

The present disclosure relates to the technical field of gimbals and, more particular, to a gimbal photographing device.

BACKGROUND TECHNOLOGY

In conventional technologies, a gimbal photographing device or a handheld gimbal photographing device can photograph stable images in a moving state, therefore it has become a favorite of many users. The gimbal photographing device uses a gyroscope and a motor to stabilize the lens photographing device, such that the captured images are stable and shake-proof.

The gimbal photographing device typically includes a machine body and a gimbal camera mounted on the machine body. When the gimbal photographing device operates, it may adjust the location of the gimbal camera based on the moving state of the user, such that the lens of the gimbal camera stays at a predetermined location to capture images, thereby capturing the images stably. However, when the gimbal photographing device is not in operation, the location of the gimbal camera may arbitrarily shake and the gimbal camera may occupy a relatively large space, causing instability in the structure of the gimbal photographing device, which is disadvantageous for carrying and storage.

SUMMARY

According to an aspect of the present disclosure, there is provided a gimbal photographing device. The gimbal photographing device includes a machine body and a foldable mechanism connected with the machine body. The gimbal photographing device also includes a gimbal camera connected with the foldable mechanism. The gimbal camera is configured to cling to the machine body through the foldable mechanism, and is configured to be positioned in an extended state or a folded state. The machine body includes a support wall configured to support the foldable mechanism and the gimbal camera. The foldable mechanism includes a base including a rotation member and a position limiting member connected with the rotation member. The position limiting member is connected with the gimbal camera. The position limiting member includes a first end and a second end that are opposingly disposed. The rotation member is rotatably connected with the support wall around a rotation axis direction to cause the gimbal camera to rotate relative to the machine body. The rotation axis direction is slantly disposed with respect to the support wall. The foldable mechanism includes a position limiting element connected with the support wall along a direction perpendicular to the rotation axis direction. The rotation member is configured to cause the gimbal camera to rotate to the extended state. The first end of the position limiting member abuts against the position limiting element. The rotation member is also configured to cause the gimbal camera to rotate to the folded state. The second end of the position limiting member opposing the first end abuts against the position limiting element. The gimbal camera clings to the support wall.

BRIEF DESCRIPTION OF THE DRAWINGS

To more clearly explain the technical solutions of the present disclosure, next, the accompanying drawings illustrating the embodiments will be briefly introduced. The accompanying drawings described below are only some embodiments of the present disclosure. A person having ordinary skills in the art can obtain other drawings based on the accompanying drawings without spending creative effort.

DETAILED DESCRIPTION OF THE EMBODIMENTS

The technical solutions of the embodiments of the present disclosure will be described in detail with reference to the accompanying drawings of the embodiments of the preset disclosure. The embodiments described herein are only some embodiments of the present disclosure, and are not all of the embodiments. All other embodiments obtained by a person having ordinary skills in the art based on these embodiments of the present disclosure without spending creative effort all belong to the scope of protection of the present disclosure.

The illustrative embodiments will be described in detail, examples of which are shown in the accompanying drawings. In the following descriptions, when the accompanying drawings are referenced to, unless there are other express indication, the same numbers in different accompanying drawings indicate the same or similar elements. The implementation methods described in the following illustrative embodiments do not represent all implementation methods consistent with the present disclosure. Conversely, they are only examples of the device and method that are consistent with some aspects of the present disclosure that are described in the accompanying claims.

The terms used in the present disclosure are only for the purpose of describing specific embodiments, and are not for limiting the present disclosure. The singular forms of "a," "the," and "said" used in the present disclosure and the accompanying claims also include plural forms, unless the context indicates other meaning expressly. It should be understood that the term "and/or" used in the present description means any or all possible combinations of one or multiple associated listed items.

With regard to the issue of the gimbal camera arbitrarily shaking, the structure being not stable and occupying a large space when the gimbal photographing device is not in operation, the present disclosure provides a gimbal photographing device that occupies a small space when not in operation and that is convenient to carry. The gimbal photographing device of the present disclosure will be described in detail with reference to the accompanying drawings. When there is no conflict, the following embodiments and features of the embodiments can be combined with one another.

Figure 1:
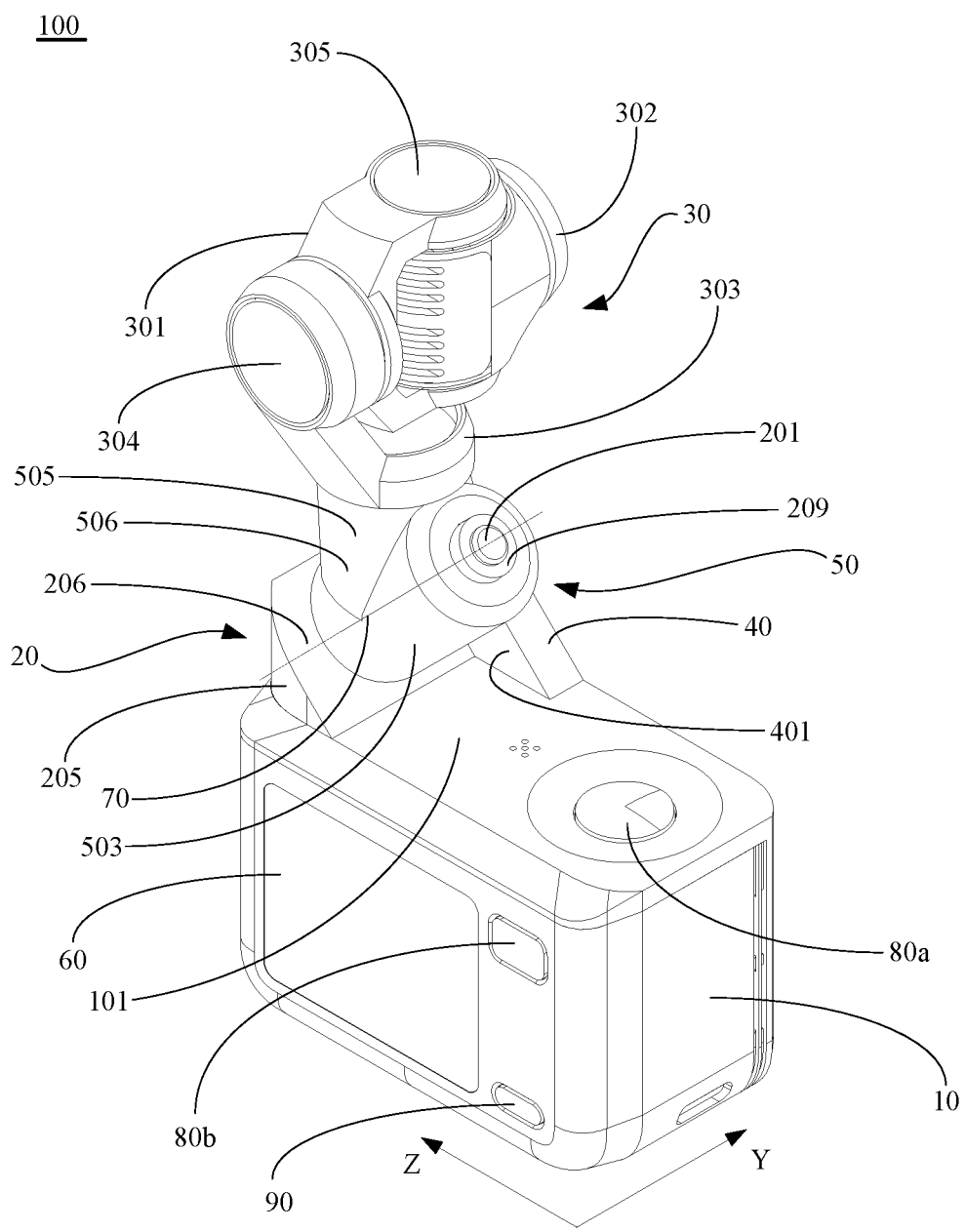
FIG. 1 is a perspective view of a gimbal photographing device in an extended state, according to an embodiment of the present disclosure.
Figure 2:
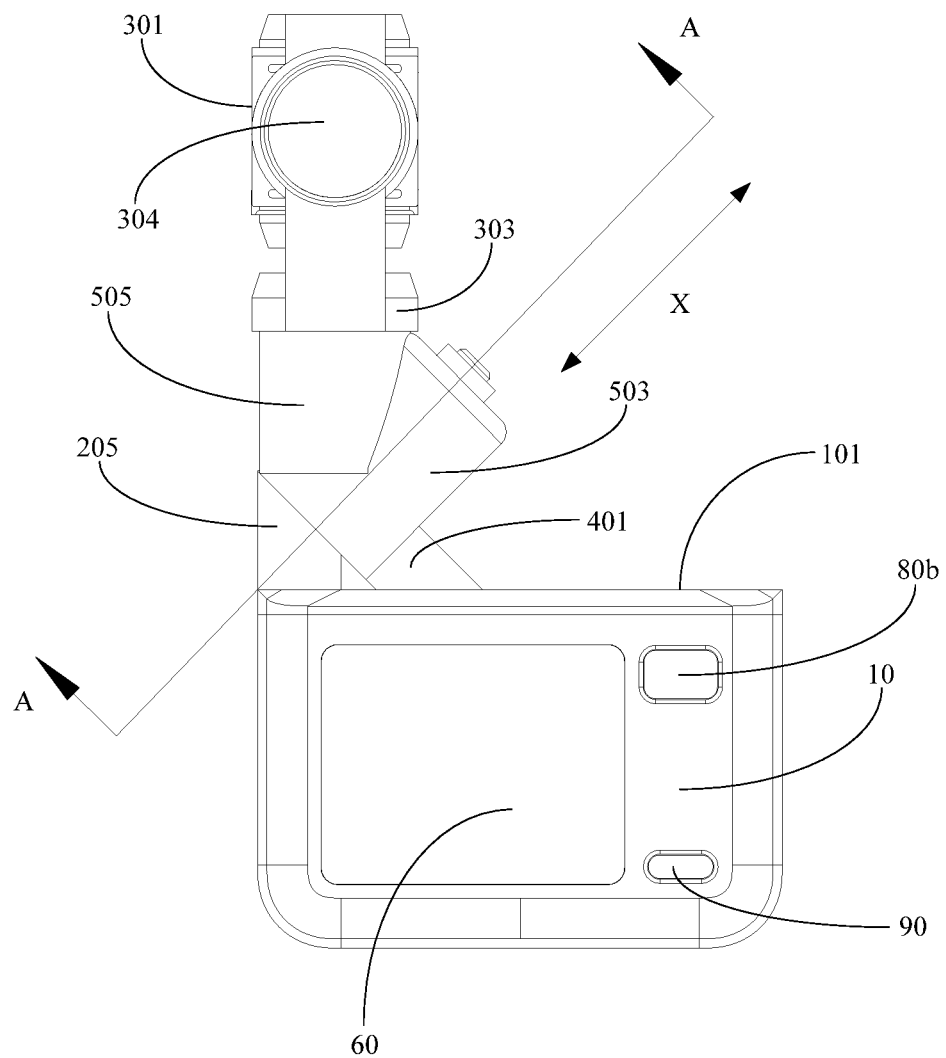
FIG. 2 is a side view of the gimbal photographing device in the extended state, according to an embodiment of the present disclosure.
Figure 3:
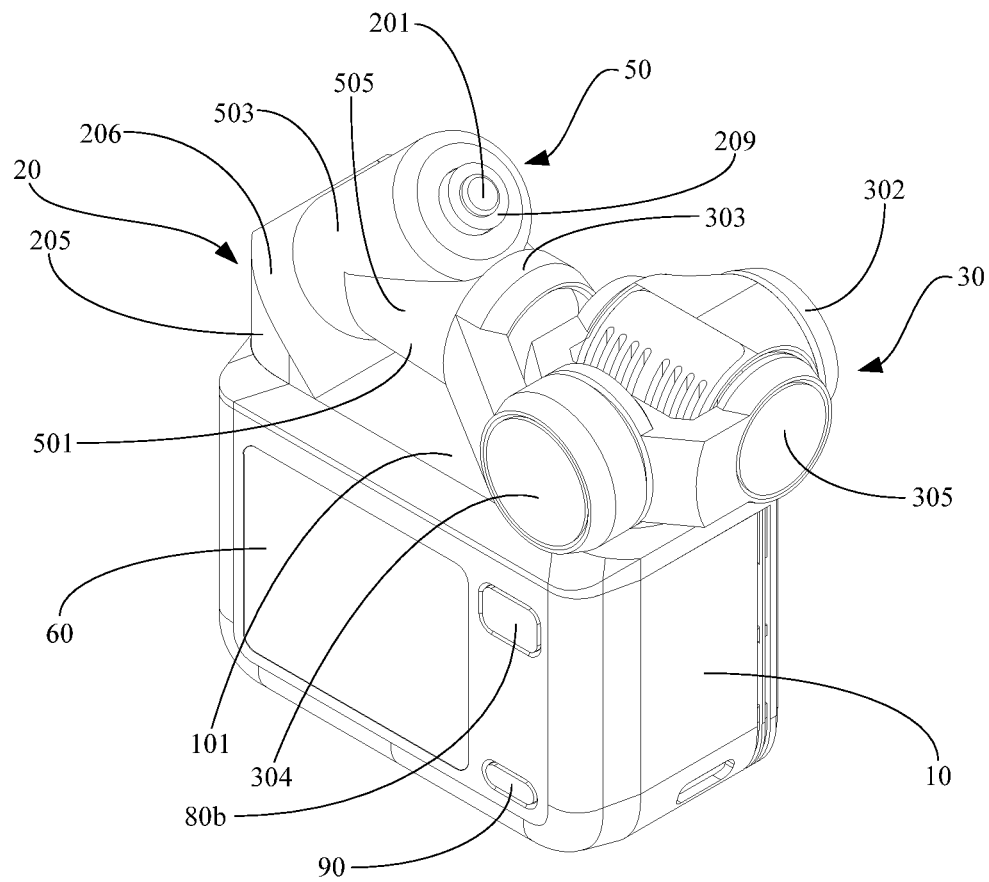
FIG. 3 is a perspective view of the gimbal photographing device in a folded state, according to an embodiment of the present disclosure.
Figure 4:
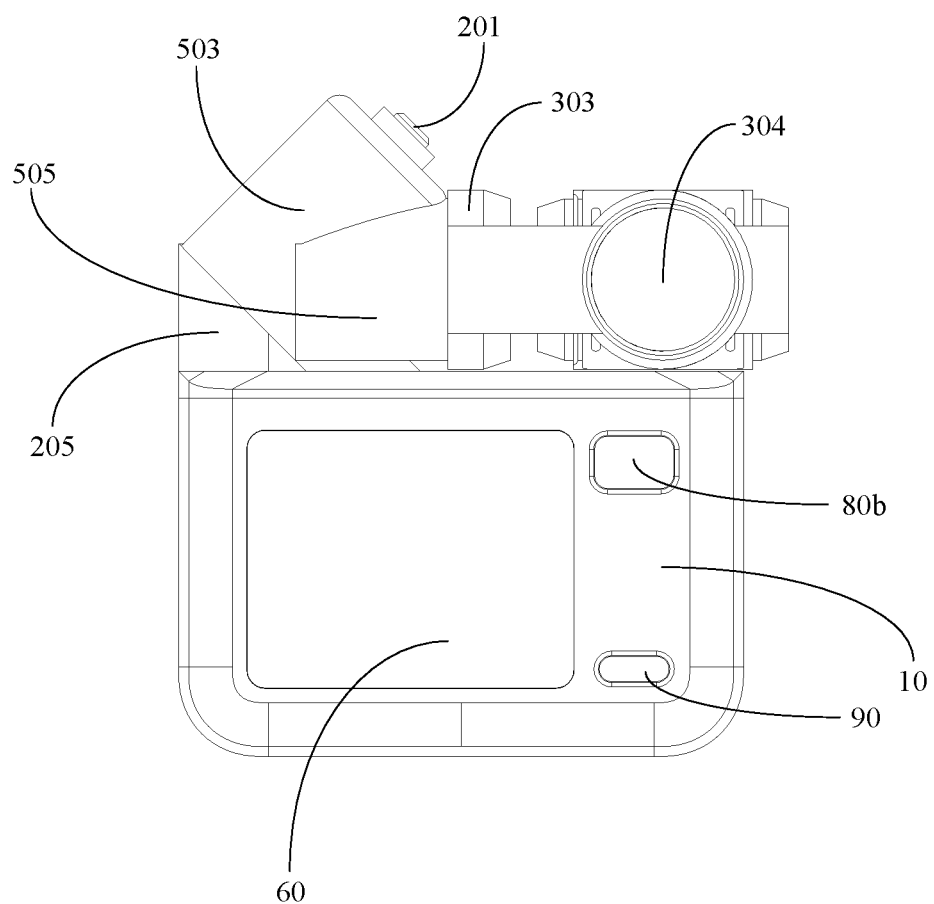
FIG. 4 is a side view of the gimbal photographing device in the folded state, according to an embodiment of the present disclosure.

Referring to FIG. 1 to FIG. 4, embodiments of the present disclosure provide a gimbal photographing device 100, which may include a machine body 10, a foldable mechanism 20 connected with the machine body 10, and a gimbal camera 30 connected with the foldable mechanism 20. The gimbal camera 30 may cling to the machine body 10 (e.g., be disposed in close proximity to the machine body 10, and in contact or not in contact with the machine body 10) through the foldable mechanism 20. The machine body 10 may include a support wall 101 configured to support the foldable mechanism 20 and the gimbal camera 30. The gimbal camera 30 may be in an extended state (the non-folded state as shown in FIG. 1 and FIG. 2) and a folded state (as shown in FIG. 3 and FIG. 4). The foldable mechanism 20 can cause the gimbal camera 30 to switch between the two states of the extended state and the folded state. In a general situation, the gimbal camera 30 is in the folded state when not in operation. When in operation, the gimbal camera 30 can be in the extended state or in the folded state. In this embodiment, the mounting location of the foldable mechanism 20 may be provided at a left edge of the support wall 101 of the machine body 10, or at the right edge of the support wall 101 of the machine body 10. In the example shown in FIG. 1, the mounting location of the foldable mechanism 20 may be provided at the left edge of the support wall 101 of the machine body 10. The machine body 10 may include a rectangular structure. The support wall 101 may be located at a top surface of the machine body 10.

In the configuration, the foldable mechanism 20 may include a position limiting element 40 and a base 50. The base 50 may include a rotatable member 503 and a position limiting member 505 connected with the rotatable member 503. The position limiting member 505 may be connected with the gimbal camera 30. The position limiting member 505 may include a first end 501 (as shown in FIG. 3) and a second end 506 (as shown in FIG. 1) that are opposingly disposed. The first end 501 and the second end 506 may be understood as two side portions of the position limiting member 505 symmetrically disposed relative to the gimbal camera 30. The rotatable member 503 may be rotatably connected with the support wall 101 around a rotation axis direction 70, to cause the gimbal camera 30 to rotate relative to the machine body 10, thereby realizing switching between the two states, the extended state and the folded state, for the gimbal camera 30. The rotation axis direction 70 may be slantly or tiltingly disposed with respect to the support wall 101. The configuration direction of the rotation axis direction 70 is shown as the X direction in FIG. 2. The position limiting element 40 may be connected with the support wall 101 along a direction perpendicular to the rotation axis direction 70, as shown in FIG. 1 as the Y direction. In some embodiments, the tilting angle between the rotation axis direction 70 and the support wall 101 may be in a range of 40°-50°, preferably 45°.

The rotation member 503 of the base 50 may cause the gimbal camera 30 to rotate to the extended state. The first end 501 of the position limiting member 505 may abut against the position limiting element 40. The location of the gimbal camera 30 may be limited through the coupling between the first end 501 of the position limiting member 505 and the position limiting element 40, such that the location of the gimbal camera 30 is stably maintained in the extended state. The rotation member 503 of the base 50 may cause the gimbal camera 30 to rotate to the folded state. The second end 506 of the position limiting member 505 may abut against the position limiting element 40. The gimbal camera 30 may cling to the support wall 101. That is, the gimbal camera 30 may be received or positioned at the top surface of the machine body 10, which can reduce the volume of the gimbal photographing device 100 in order to solve the issue of space occupied by the gimbal camera 30 being relatively large when in the non-operating folded state, and can reduce or eliminate the shaking of the gimbal camera 30 in the non-operating folded state. As a result, the portability of the gimbal photographing device 100 for carrying and storage can be enhanced.

It can be known from the above embodiments, in the gimbal photographing device 100 of the present disclosure, by using the rotation member 503 of the base 50 of the foldable mechanism 20 to cause the gimbal camera 30 to switch between the extended state and the folded state, the folding of the gimbal camera 30 is realized. When the gimbal camera 30 extends to operate, the location of the gimbal camera 30 can be limited through the coupling between the first end 501 of the position limiting member 505 and the position limiting element 40, such that the location of the gimbal camera 30 in the extended state is stably maintained. When the gimbal camera 30 is not in operation, the gimbal camera 30 can be folded to cling to the support wall 101 of the machine body 10, and the location of the gimbal camera 30 can be limited through the coupling between the second end 506 of the position limiting member 505 and the position limiting element 40. That is, the gimbal camera 30 may be received or positioned at a side of the machine body 10, which can reduce the volume of the gimbal photographing device 100 in order to solve the issue of the space occupied by the gimbal camera 30 being relatively large when in the non-operating folded state. As a result, the portability of the gimbal photographing device 100 for carrying and storage can be further enhanced, and the overall compactness of the structural design can be improved.

In an embodiment, the gimbal camera 30 may include a gimbal frame and an imaging device 302 carried by the gimbal frame. In this configuration, the gimbal frame can be a single-axis, two-axis, or multi-axis gimbal frame. In the example shown in the figure, the gimbal frame is a three-axis gimbal frame. The three-axis gimbal frame includes a yaw axis assembly 303 movably connected with the position limiting member 505 of the base 50, a roll axis assembly 304 movably connected with the yaw axis assembly 303, and a pitch axis assembly 305 movably connected with the roll axis assembly 304. The imaging device 302 may be carried by the pitch axis assembly 305. The yaw axis assembly 303 may be configured to control the yaw movement of the gimbal camera 30 through a yaw axis motor, the roll axis assembly 304 may be configured to control the roll movement of the gimbal camera 30 through a roll axis motor, and the pitch axis assembly 305 may be configured to control the pitch movement of the gimbal camera 30 through a pitch axis motor. Thus, the imaging device 302 may be controlled to capture images from different imaging angles, and the location of the gimbal camera 30 may be adjusted based on a desired imaging angle. When the gimbal camera 30 is in the folded state (as shown in FIG. 4), a rotation axis of the yaw axis assembly 303 is disposed perpendicular to the support wall 101 of the machine body 10, a rotation axis of the roll axis assembly 304 is disposed in parallel with the support wall 101 of the machine body 10, and a rotation axis of the pitch assembly 305 is disposed perpendicular to the support wall 101 of the machine body 10. When the gimbal camera 30 is in the extended state (as shown in FIG. 1), the rotation axis of the yaw axis assembly 303 is disposed perpendicular to the rotation axis direction 70, a location of the rotation axis of the roll axis assembly 304 relative to the rotation axis direction 70 may change with the rotation of the yaw axis assembly 303, and a location of the rotation axis of the pitch axis assembly 305 relative to the rotation axis direction 70 may change with the rotation of the roll axis assembly 304.

In an embodiment, the first end 501 of the position limiting member 505 may be provided with a first abutting surface, the second end 506 of the position limiting member 505 may be provided with a second abutting surface, and an end of the imaging device 302 of the gimbal camera 30 facing against the rotation axis direction 70 may be provided with a clinging surface 301 (as shown in FIG. 1). The rotation member 503 of the base 50 may cause the gimbal camera 30 to rotate to the extended state. The first abutting surface of the position limiting member 505 may abut against the position limiting element 40. The location of the gimbal camera 30 may be limited through the coupling between the first abutting surface of the position limiting member 505 and the position limiting element 40, such that the location of the gimbal camera 30 in the extended state can be stably maintained. When the gimbal camera 30 is not in operation, the rotation member 503 of the base 50 may cause the gimbal camera 30 to rotate to the folded state. The second abutting surface of the position limiting member 505 may abut against the position limiting element 40. The clinging surface 301 of the gimbal camera 30 may cling to the support wall 101 of the machine body 10. The location of the gimbal camera 30 may be limited through the coupling between second abutting surface of the position limiting member 505 and the position limiting element 40, which can reduce the volume of the gimbal photographing device 100, such that the location of the gimbal camera 30 in the non-operating folded state can be stably maintained, thereby avoiding shaking of the gimbal camera 30.

In some embodiments, to make the location of the gimbal camera 30 in the folded state more stable, fastening structures configured to couple with one another can be provided at the clinging surface 301 of the gimbal camera 30 and at a location of the support wall 101 of the machine body 10 corresponding to the clinging surface 301 of the gimbal camera 30, such that when the gimbal camera 30 clings to the support wall 101 of the machine body 10, the gimbal camera 30 is even less prone to shake. For example, the fastening structures that are configured to couple with one another can be one of snap-fit structures, or magnetic attachment structures, or locking structures.

In an embodiment, the gimbal photographing device 100 may also include a rotation axis assembly connected with the support wall 101. The rotation axis assembly may include a rotation axis 201 disposed along the rotation axis direction 70 and a support member 205 connected with the support wall 101. The support member 205 may include a support surface 206. The support surface 206 may be slantly or tiltingly disposed relative to the support wall 101 in a direction perpendicular to the rotation axis direction 70. In some embodiments, the tilting angle between the support surface 206 of the support member 205 and the support wall 101 may be in a range of 40°-50°, for example, 45°. It should be noted that the rotation axis 201 may adopt multiple different rotation configurations, such as a damping axis, a spring axis, etc.

In some embodiments, the position limiting element 40 may be connected to a side portion of the support member 205. The position limiting element 40 may be disposed perpendicular to the support surface 206 of the support member 205. Both of the two ends of the position limiting element 40 may include a position limiting boss 401 protruding from the position limiting member 505 of the base 50 along a radial direction of the rotation axis direction 70. The position limiting boss 401 may be configured to couple with the first abutting surface and the second abutting surface of the position limiting member 505 of the base 50. When the gimbal camera 30 rotates to the extended state, the gimbal camera 30 may be position-limited through the coupling between the position limiting boss 401 located at a side of the position limiting element 40 away from the support wall 101 of the machine body 10 and the first abutting surface of the position limiting member 505. When the gimbal camera 30 rotates to the folded state, the gimbal camera 30 may be position-limited through the coupling between the position limiting boss 401 located at a side of the position limiting element 40 adjacent the support wall 101 of the machine body 10 and the second abutting surface of the position limiting member 505. In some embodiments, the position limiting element 40 and the support member 205 are integrally formed, and the connection portion between the position limiting element 40 and the support member 205 is a smooth transition, which may enhance the structural strength of the position limiting member 40.

Figure 5:
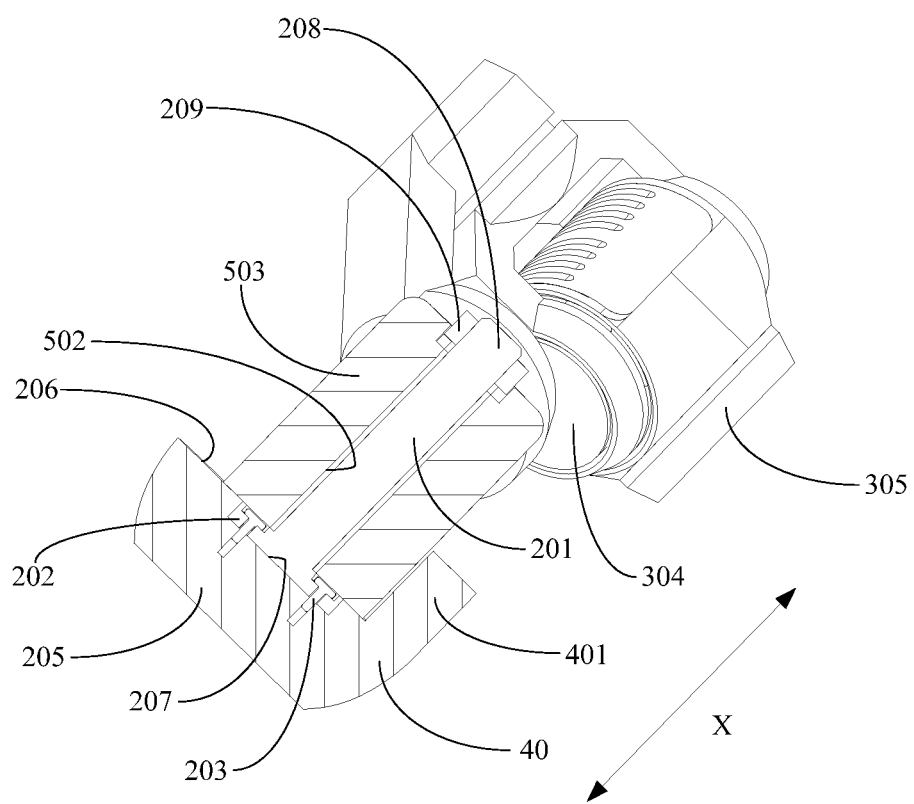
FIG. 5 is a cross-sectional view of the gimbal photographing device along the A-A direction shown in FIG. 2.

In an embodiment, as shown in FIG. 5, the rotation member 503 of the base 50 may be provided with a through hole 502 extending in the direction of the rotation axis direction 70. The rotation axis 201 is configured to penetrate or extend throughout the through hole 502, such that the rotation member 503 of the base 50 is pivotably connected with the rotation axis 201. A first end of the rotation axis 201 may be provided with an axis base 202. The support member 205 may be provided with a positioning groove 207. The axis base 202 may be configured to snap-fit with the positioning groove 207. The axis base 202 may be fixed to the support member 205 through a fastening member 203, thereby fixing the rotation axis 201 with the support member 205. In some embodiments, the fastening member 203 may be a screw, or may use fixed connection methods such as a pin, gluing, etc. The similar variations of the connection methods all fall within the scope of protection of the present disclosure. The second end of the rotation axis 201 may be provided with a positioning end 208. The positioning end 208 may be configured to protrude from the rotation member 503 of the base 50. The positioning end 208 may be detachably provided with a positioning member 209, thereby detachably connecting the base 50 and the rotation axis 201. When the positioning member 209 is detached from the positioning end 208 of the rotation axis 201, the rotation member 503 of the base 50 can be retrieved from the rotation axis 201, thereby separating the gimbal camera 30 and the machine body 10, making it convenient for replacement, carrying, and storage. In some embodiments, the positioning end 208 may be a threaded segment. The positioning member 209 may be a threaded connection member matching with the threaded segment. Other detachable connection methods such as screws can also be used. Such similar variations of the connection methods all fall within the scope of the protection of the present disclosure.

In an embodiment, the positioning member 505 of the base 50 and the rotation member 503 may be slantly or tiltingly disposed with respect to one another. The gimbal camera 30 may be connected with the positioning member 505 along a slant or tilting direction of the positioning member 505 relative to the rotation member 503. Thus, the rotation angle of the gimbal camera 30 may be limited. In some embodiments, the tilting angle between the position limiting member 505 and the rotation member 503 may be in a range of 40°-50°, for example, 45°. For example, the gimbal camera 30 may be controlled to rotate along a 45° direction with respect to the support wall 101 of the machine body 10, from the folded state (i.e., folded to cling to the support wall 101 of the machine body 10) to the extended state (i.e., vertically standing over the machine body 10), or from the extended state to the folded state. In some embodiments, the position limiting member 505 of the base 50 and the rotation member 503 may be integrally formed.

In some embodiments, the length of the gimbal camera 30 (which can be understood as the length in the Z direction shown in FIG. 1) may be smaller than the length of the machine body 10 (which can be similarly understood as the length in the Z direction shown in FIG. 1). This may ensure that when the gimbal camera 30 is in the folded state, the gimbal camera 30 is within the structural range of the machine body 10. The size of the gimbal camera 30 may match with the size of the positioning member 505 of the base 50, to avoid the issue relating to the size of the gimbal camera 30 being too large or too small such that it cannot cling to the support wall 101 of the machine body 10 when the gimbal camera 30 is in the folded state. For example, in the illustrated embodiment, the size of the gimbal camera 30 is the same as the size of the positioning member 505 of the base 50.

In an embodiment, the machine body 10 may be provided with a button for controlling the imaging device 302 to perform photographing (which may be capturing photos or capturing videos). In some embodiments, the support wall 101 of the machine body 10 may be provided with a first button 80a (the first button 80a shown in the figure is provided at the top surface of the machine body 10), such that the user can operate the imaging device 302 to perform photographing when the gimbal camera 30 is in the extended state. In some embodiments, a side wall of the machine body 10 that is adjacent the support wall 101 may be provided with a second button 80b (the second button 80b shown in the figure is provided on a side surface of the machine body 10). For example, the second button 80b may be provided at a side surface of the machine body 10 facing against the lens of the imaging device 302, such that the user can operate the imaging device 302 to perform photographing when the gimbal camera 30 is in the folded state, so the gimbal camera 30 can still be used for photographing when in the folded state. In addition, when the gimbal camera 30 is in the extended state, the second button 80b may be operated to adjust the gimbal frame of the gimbal camera 30 to change the imaging angle of the imaging device 302, or to switch the imaging modes of the imaging device 302. For example, when the gimbal camera 30 is in the extended state, pressing the second button 80b for one time may switch the imaging mode of the imaging device 302 between the photo mode and the video mode. Continuously pressing the second button 80b for two times may adjust the gimbal frame to a back to normal state, thereby realizing the automatic back to normal function. Continuously pressing the second button 80b for three times may control the yaw axis assembly 303 of the gimbal frame to rotate, such that the imaging device 302 rotates to face the user to realize the selfie function. It can be understood that the number of the times the button is continuously pressed, and the corresponding mode realized by the gimbal camera 30 can be configured based on needs, which is not limited by the present disclosure.

In some embodiments, the machine body 10 may be provided with a power button 90 configured to turn on or off the gimbal photographing device 100. In some embodiments, the power button 90 may be provide on a side wall of the machine body 10 adjacent the support wall 101. In the illustrated example, the power button 90 may be provided on the same side surface of the machine body 10 as the second button 80b, and may be located over the second button 80b.

Figure 6:
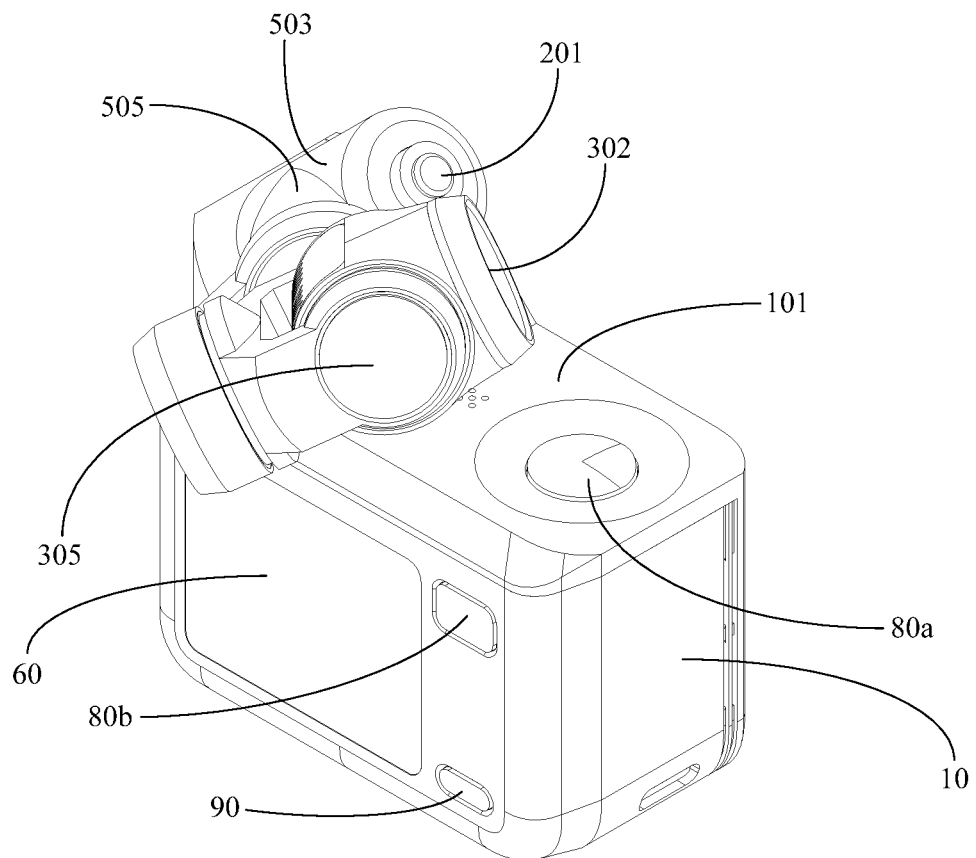
FIG. 6 is a perspective view of the gimbal photographing device in a rotation process, according to an embodiment of the present disclosure.

Referring to FIG. 1, FIG. 3, and FIG. 6, when the gimbal camera 30 rotates from the extended state to the folded state, the changing process of the location of the gimbal camera 30 is rotating from the location where the gimbal camera 30 vertically stands at the support wall 101 of the machine body 10 as shown in FIG. 1 to the location where the gimbal camera 30 is tilted with respect to the support wall 101 of the machine body 10 as shown in FIG. 6, and then rotating from the location shown in FIG. 6 to the location where the gimbal camera 30 slings to support wall 101 of the machine body 10 as shown in FIG. 3. Correspondingly, the location change of the gimbal camera 30 from the extended state to the non-operating state is similar. When the gimbal camera 30 rotates from the folded state to the extended state, the location changing process of the gimbal camera 30 is rotating from the location where the gimbal camera 30 clings to the support wall 101 of the machine body 10 as shown in FIG. 3 to the location where the gimbal camera 30 is tilted with respect to the support wall 101 of the machine body 10 as shown in FIG. 6, and then rotating from the location shown in FIG. 6 to the location where the gimbal camera 30 vertically stands at the support wall 101 of the machine body 10 as shown in FIG. 1. Correspondingly, the location change of the gimbal camera 30 when switching from the non-operating state to the extended state is similar. When the gimbal camera 30 operates in the extended state, the imaging device 302 may be operated to perform photographing through the first button 80a. When the gimbal camera 30 is in the folded state and is to operate, the imaging device 302 may be operated to perform photographing through the second button 80b.

In an embodiment, the gimbal camera 30 may be manually rotated. The gimbal photographing device 100 may include a locking structure configured to lock the rotation member 503 of the base 50. When the rotation member 503 of the base 50 causes the gimbal camera 30 to rotate to the extended state, the location of the rotation member 503 of the base 50 may be locked through the locking structure, such that the location of the gimbal camera 30 at the extended state is stably maintained. The detailed structure of the locking structure may be designed based on different needs. For example, the locking structure may be a snap-fit structure, a latch and lock mechanism, etc. In another embodiment, the gimbal camera 30 may be directly driven by a driving motor to rotate, and may not use the above described locking structure. The gimbal photographing device 100 may also include a driving motor connected to the rotation member 503 of the base 50. The driving motor may drive the rotation member 503 of the base 50 to rotate around the rotation axis 201, to cause the gimbal camera 30 to rotate relative to the machine body 10. The rotation angle of the gimbal camera 30 may be configured by setting the operation time or speed of the driving motor.

In an embodiment, the gimbal photographing device 100 may also include a screen 60. The screen 60 may be disposed at a side surface of the machine body 10, for a user to observe during photographing. In the illustrated example, the screen 60, the second button 80b, and the power button 90 are disposed at the same side surface of the machine body 10, i.e., the side surface of the machine body 10 facing against the imaging device 302. In another embodiment, the gimbal photographing device 100 may also include a mounting bracket for mounting an external display device. The mounting bracket may be mounted on the machine body 10. The external display device may be a device that can receive an image captured by the imaging device 302, such as a cell phone or a tablet, etc., which may also be used for observation by the user during photographing.

In summary, in the gimbal photographing device 100 of the present disclosure, the gimbal camera 30 may be caused to rotate by the rotation member 503 of the base 50 of the foldable mechanism 20 to switch between two states: the extended state and the folded state, thereby realizing the folding function for the gimbal camera 30. When the gimbal camera 30 is in the extended state, the gimbal camera 30 may extend to operate normally. The location of the gimbal camera 30 may be limited by the coupling between the first abutting surface of the position limiting member 505 and the position limiting element 40, such that the location of the gimbal camera in the extended state can be stably maintained. When the gimbal camera 30 is not operating, the gimbal camera 30 may be folded to cling to the support wall 101 of the machine body 10. The location of the gimbal camera 30 may be limited by the coupling between the second abutting surface of the position limiting member 505 and the position limiting element 40, thereby reducing the volume of the gimbal photographing device 100 and solving the issues of the space occupied by the gimbal camera 30 being relatively large when in the non-operating folded state. Shaking of the gimbal camera 30 in the non-operating folded state may also be avoided. As a result, the portability of the gimbal photographing device 100 for carrying and the storage can be enhanced. The overall compactness of the structural design can also be improved.

It should be noted that in this specification, the relational terms such as "first," "second" etc., are only used to distinguish one entity or operation from another entity or operation, and do not require or imply that any such actual relationship or order exists between these entities or operations. The term "including," "comprising" or any of their variations encompass non-exclusive inclusion, such that the process, method, object or device that includes a series of elements not only include those elements, but also include other elements that have not been expressly listed, or also include inherent elements included in the process, method, object or device. When not limited further, an element modified by the phrase "including a . . . " does not exclude that the process, method, object or device that includes the element also includes other same elements.

The above introduced in detail the method and device provided by the embodiments of the present disclosure. This specification uses specific examples to explain the principle and implementation methods of the present disclosure. The descriptions of the above embodiments are only used to help understand the methods and core spirit of the present disclosure. In the meantime, a person having ordinary skills in the art can have modifications to the specific implementation methods and application scope based on the spirit of the present disclosure. In summary, the content of the present specification should not be understood to limit the present disclosure.

The disclosed content of the present disclosure includes materials subject to copyright protection. The copyright is owned by the copyright owner. The copyright owner does not object to copying, by anyone, this patent document or this patent disclosure that is in the official record and history of the patent and trademark office.

What is claimed is:

1. A gimbal photographing device, comprising:
   a machine body;
   a foldable mechanism connected with the machine body; and
   a gimbal camera connected with the foldable mechanism,
   wherein the gimbal camera is configured to cling to the machine body through the foldable mechanism, and is configured to be positioned in an extended state or a folded state, and
   wherein the machine body includes a support wall configured to support the foldable mechanism and the gimbal camera,
   wherein the foldable mechanism includes:
      a base including a rotation member and a position limiting member connected with the rotation member, wherein the position limiting member is connected with the gimbal camera, the position limiting member includes a first end and a second end that are opposingly disposed, the rotation member is rotatably connected with the support wall around a rotation axis direction to cause the gimbal camera to rotate relative to the machine body, and the rotation axis direction is slantly disposed with respect to the support wall;
      a position limiting element connected with the support wall along a direction perpendicular to the rotation axis direction;
      wherein the rotation member is configured to cause the gimbal camera to rotate to the extended state, the first end of the position limiting member abuts against the position limiting element, and
      wherein the rotation member is also configured to cause the gimbal camera to rotate to the folded state, the second end of the position limiting member opposing the first end abuts against the position limiting element, and the gimbal camera clings to the support wall.

2. The gimbal photographing device according to claim 1, wherein the first end of the position limiting member is provided with a first abutting surface, the second end of the position limiting member is provided with a second abutting surface, and an end of the gimbal camera facing against the rotation axis direction is provided with a clinging surface, and
   wherein the rotation member is configured to cause the gimbal camera to rotate to the extended state, the first abutting surface abuts the position limiting element, and
   wherein the rotation member is configured to cause the gimbal camera to rotate to the folded state, the second abutting surface abuts against the position limiting element, and the clinging surface clings to the support wall.

3. The gimbal photographing device according to claim 1, further comprising a driving motor connected with the base, wherein the driving motor is configured to drive the rotation member to rotate.

4. The gimbal photographing device according to claim 1, further comprising a locking structure configured to lock the rotation member.

5. The gimbal photographing device according to claim 1, further comprising a rotation axis assembly connected with the support wall, wherein the rotation axis assembly includes a rotation axis, the rotation axis is disposed along the rotation axis direction, and the rotation member is pivotably connected with the rotation axis.

6. The gimbal photographing device according to claim 5, wherein the rotation axis assembly also includes a support member connected with the support wall, the support member includes a support surface, the support surface is slantly disposed with respect to the support wall in a direction perpendicular to the rotation axis direction, and the rotation axis is perpendicularly connected with the support surface.

7. The gimbal photographing device according to claim 6, wherein a tilting angle between the support surface and the support wall is in a range of 40° to 50°.

8. The gimbal photographing device according to claim 6, wherein the position limiting element is connected to a side portion of the support member, the position limiting element is perpendicularly disposed with respect to the support surface, and both of two ends of the position limiting element include a position limiting boss protruding from the rotation member along a radial direction of the rotation axis direction.

9. The gimbal photographing device according to claim 6, wherein a first end of the rotation axis is provided with an axis base, and the axis base is fixed to the support member through a fastening member.

10. The gimbal photographing device according to claim 9, wherein the support member is provided with a positioning groove, and the axis base is provided in the positioning groove.

11. The gimbal photographing device according to claim 6, wherein the rotation member is provided with a through hole extendedly disposed along the rotation axis direction, and the rotation axis is configured to penetrate throughout the through hole.

12. The gimbal photographing device according to claim 11, wherein a second end of the rotation axis is provided with a positioning end, the positioning end is configured to protrude from the rotation member, and the positioning end is detachably provided with a positioning member.

13. The gimbal photographing device according to claim 12, wherein the positioning end is a threaded segment, and the positioning member is a threaded connection member that matches with the threaded segment.

14. The gimbal photographing device according to claim 1, wherein a tilting angle between the rotation axis direction and the support wall is in a range of 40° to 50°.

15. The gimbal photographing device according to claim 1, wherein the position limiting member is slantly disposed with respect to the rotation member, and the gimbal camera is connected with the position limiting member along a direction in which the position limiting member tilts relative to the rotation member.

16. The gimbal photographing device according to claim 15, wherein a tilting angle between the position limiting member and the rotation member is in a range of 40° to 50°.

17. The gimbal photographing device according to claim 1, wherein the gimbal camera includes a three-axis gimbal frame and an imaging device carried on the three-axis gimbal frame.

18. The gimbal photographing device according to claim 17, wherein the three-axis gimbal frame includes a yaw axis assembly movably connected with the base, a roll axis assembly movably connected with the yaw axis assembly, and a pitch axis assembly movably connected with the roll axis assembly, and the imaging device is carried on the pitch axis assembly.

19. The gimbal photographing device according to claim 18, wherein a rotation axis of the yaw axis assembly is perpendicularly disposed with respect to the rotation axis direction.

20. The gimbal photographing device according to claim 1, further comprising a screen disposed at the machine body.

21. The gimbal photographing device according to claim 1, further comprising a mounting frame for mounting an external display device, wherein the mounting frame is disposed at the machine body.

22. The gimbal photographing device according to claim 1, further comprising a first button disposed at the support wall, and configured to operate the gimbal camera to perform photographing when the gimbal camera is in the extended state.

23. The gimbal photographing device according to claim 1, further comprising a second button disposed at a side wall of the machine body adjacent the support wall, and configured to operate the gimbal camera to perform photographing when the gimbal camera is in the folded state.

24. The gimbal photographing device according to claim 1, further comprising a second button disposed at a side wall of the machine body adjacent the support wall, and configured to adjust an imaging angle or an imaging mode of the gimbal camera when the gimbal camera is in the extended state.

25. The gimbal photographing device according to claim 1, further comprising a power button configured for turning on or off the gimbal photographing device, and disposed at a side wall of the machine body adjacent the support wall.

* * * * *